(12) United States Patent
Oosterman et al.

(10) Patent No.: US 9,425,570 B2
(45) Date of Patent: Aug. 23, 2016

(54) POWER RECEPTACLE ASSEMBLY

(71) Applicant: Douglas J. Oosterman, Grand Rapids, MI (US)

(72) Inventors: Douglas J. Oosterman, Grand Rapids, MI (US); Gary R. Bacon, Muskegon, MI (US); Joseph T. Brophy, Rockford, MI (US)

(73) Assignee: Douglas J. Oosterman, Grand Rapids, MI (US)

( * ) Notice: Subject to any disclaimer, the term of this patent is extended or adjusted under 35 U.S.C. 154(b) by 0 days.

(21) Appl. No.: 14/571,474

(22) Filed: Dec. 16, 2014

(65) Prior Publication Data

US 2015/0380886 A1     Dec. 31, 2015

(30) Foreign Application Priority Data

Jun. 26, 2014   (TW) .............................. 103122057 A

(51) Int. Cl.
  *H01R 13/60* (2006.01)
  *H01R 27/02* (2006.01)
  *H01R 13/506* (2006.01)
  *H02G 3/10* (2006.01)
  *H02G 3/14* (2006.01)

(52) U.S. Cl.
  CPC ............ *H01R 27/02* (2013.01); *H01R 13/506* (2013.01); *H02G 3/10* (2013.01); *H02G 3/14* (2013.01)

(58) Field of Classification Search
  CPC .................................. H02G 3/10; H02G 3/14
  USPC .............................. 439/535, 540.1, 652, 653
  See application file for complete search history.

(56) References Cited

U.S. PATENT DOCUMENTS

| 5,744,750 | A  | * | 4/1998 | Almond ................. | H02G 3/185 174/541 |
| 6,024,588 | A  | * | 2/2000 | Hsu ........................ | H01R 31/02 439/173 |
| 6,113,416 | A  | * | 9/2000 | Holzer ................... | H01R 33/06 439/357 |
| 6,257,925 | B1 | * | 7/2001 | Jones .................. | H01R 12/7023 439/357 |
| 7,025,618 | B2 | * | 4/2006 | Fukuda .............. | H01R 13/6271 439/353 |
| 7,179,996 | B1 | * | 2/2007 | Britt ..................... | H01R 13/447 174/66 |
| 7,211,729 | B1 | * | 5/2007 | Yang .................. | H01R 13/4536 174/66 |
| 2012/0170342 | A1 | * | 7/2012 | Manning ................... | G06F 1/26 363/146 |

* cited by examiner

*Primary Examiner* — Tho D Ta
(74) *Attorney, Agent, or Firm* — Alan D. Kamrath; Kamrath IP Lawfirm, P.A.

(57) ABSTRACT

A power receptacle assembly includes a first housing, a second housing, one or more receptacle units, one or more functional receptacles, and a decorative bordered frame. Two or more through holes are disposed at lower portions of two opposing sides of the first housing to admit a hook portion formed by extending downward two outer sides of the second housing engaged with the one or more receptacle units and admit a hook portion formed by extending downward two outer sides of the one or more functional receptacle. Not only does the power receptacle feature a flexible combination of a conventional receptacle unit and a functional receptacle in operation to meet user needs and application needs, but the assembly process also features simple engagement and precise positioning.

8 Claims, 9 Drawing Sheets

POWER RECEPTACLE ASSEMBLY

BACKGROUND OF THE INVENTION

1. Technical Field

The present invention relates to power receptacle assemblies and, more particularly, to a power receptacle for admitting a plug of various electrical appliances or 3C products. The power receptacle comprises a first housing engaged with at least a functional receptacle, and a second housing engaged with at least a conventional receptacle unit, such that power receptacle manufacturers can alter the appearance of the power receptacle flexibly during a manufacturing process, thereby allowing users to make proper choices as needed.

2. Description of Related Art

A conventional power receptacle for use with a plug at one end of a power cord of various electrical appliances or 3C products usually has a plurality of slots for admitting positive and negative pins of the plug. A control switch is disposed beside the slots and is adapted to switch between ON/OFF states to not only allow the power to be turned off without unplugging the plug but also provide overload-proof protection. Furthermore, it is convenient that a plug at one end of a power cord of conventional 3C products comes in the form of a USB terminal. To this end, the industrial sector developed a power receptacle with a USB slot for admitting the USB terminal. However, the aforesaid two power receptacles in operation are usually restricted to a single function. That is, users have to choose between the conventional power receptacle and a receptacle with a USB slot or use both as needed. In addition, power receptacle manufacturers are further confronted with a problem. That is, die opening and product inventory management of the conventional power receptacles incur costs and take up much space.

To solve the aforesaid problems with the production and application of conventional power receptacles for use with plugs of various electrical appliances or 3C products, the present invention provides a flexible operation-variable power receptacle manufactured in a manner to meet market or user needs. Thus, average users can properly plug the plugs of electrical appliances or 3C products into the power receptacle.

BRIEF SUMMARY OF THE INVENTION

The present invention aims to solve existing problems with the production and application of conventional power receptacles for use with plugs of various electrical appliances or 3C products, by providing a power receptacle characterized in that: a second housing is engaged with at least a conventional receptacle unit, and at least a functional receptacle is engaged with a first housing. Thus, power receptacle manufacturers can alter the appearance of the power receptacle flexibly during a manufacturing process, thereby allowing users to make proper choices as needed.

The first objective of the present invention is to provide a power receptacle comprising a first housing, a second housing, one or more receptacle units, one or more functional receptacles, and a decorative bordered frame. Two or more through holes are disposed at the lower portions of two opposing sides of the first housing to admit a hook portion formed by extending downward two outer sides of the second housing engaged with one or more receptacle unit and admit a hook portion formed by extending downward two outer sides of one or more functional receptacle. Thus, not only does the power receptacle feature a flexible combination of a conventional receptacle unit and functional receptacle in operation to meet user needs and application needs, but the assembly process also features simple engagement and precise positioning.

The second objective of the present invention is to provide a power receptacle which comprises a first housing, a second housing, one or more receptacle units, one or more functional receptacles, and a decorative bordered frame. One or more receiving spaces are disposed on the active surface of the second housing. A recess is formed at each of two opposing peripheral flanges of each receiving space. The abutting portions formed by extending two opposing outer sides of the receptacle unit upward are guided into the receiving space of the second housing and passed through the recesses to receive a positional restriction imposed by the peripheral flanges adjacent to the bottom thereof. Hence, the receptacle units attain a modularization design, get engaged with the first housing flexibly and quickly, and can be removed from the power receptacle without destroying related components.

The third objective of the present invention is that the hook portions, which are formed by extending downward two outer sides of the second housing engaged with the receptacle unit and extending downward two outer sides of the functional receptacle engaged with the first housing, manifest appropriate elasticity.

The fourth objective of the present invention is that an upward portion of each corner in the internal space of the first housing engaged with the functional receptacle and that the second housing engaged with the receptacle unit extends to form a hook portion. The hook portions of the first housing are inserted into a space positioned beside each protruding portion extending downward from a corresponding corner as soon as the decorative bordered frame covers the upper periphery of the first housing, to enable the quick positioning required for coupling the decorative bordered frame and the first housing together and impose a peripheral positional restriction on the second housing and the functional receptacle engaged with the first housing, thereby further effectuating changes in appearance.

The fifth objective of the present invention is that two or more downward sloping guide portions are disposed on two opposing sides facing the internal space of the first housing engaged with the functional receptacle and the second housing engaged with the receptacle unit. Thus, the functional receptacle can engage with or disengage from two outer hook portions of the second housing smoothly.

The sixth objective of the present invention is that a power receptacle which comprises a second housing engaged with one or more receptacle unit, a first housing engaged with one or more functional receptacle, and a decorative bordered frame covering the upper periphery of the first housing features a flexible combination of various forms and required variations in colors and constituent materials.

The seventh objective of the present invention is that the functional receptacle engaged with the first housing has slots each provided in the form of one or more HDMI (high-definition multimedia interface), USB, Ethernet (Internet data), VGA (video), RCA (video), RCA (audio), or 3.5 mm plug (audio) to facilitate electrical conduction and insertion of the plug of 3C products.

The eighth objective of the present invention is that the surface of the functional receptacle engaged with the first housing has one or more USB slots configured to operate with power options, whereby users' charging objects effectuate appropriate electrical conduction and insertion.

The ninth objective of the present invention is that one or more ribs are disposed on the two opposing outer sides of the second housing engaged with the one or more receptacle units and adapted to maintain appropriate tightness between the one or more receptacle units inserted into the first housing and a corresponding portion thereof.

The tenth objective of the present invention is that one or more power cord outlets are disposed at the bottom of the first housing engaged with the functional receptacle and the second housing engaged with the receptacle unit. Thus, a power cord penetratingly disposed at the power cord outlet effectuates power connection of different data in accordance with required cable management.

The eleventh objective of the present invention is that a recessed opening is disposed at the periphery of each receiving space on the upper portion of the second housing engaged with the one or more receptacle unit. Thus, the periphery of the upper portion of the receptacle unit guided into the receiving space abuts against the recessed opening.

The twelfth objective of the present invention is that two opposing sides at the upper portion of the functional receptacle engaged with the first housing extend to form protruding peripheries, respectively. Thus, two peripheries of the upper portion of the functional receptacle inserted into the first housing abut against the upper portion of the first housing.

DETAILED DESCRIPTION OF THE INVENTION

Figure 1:
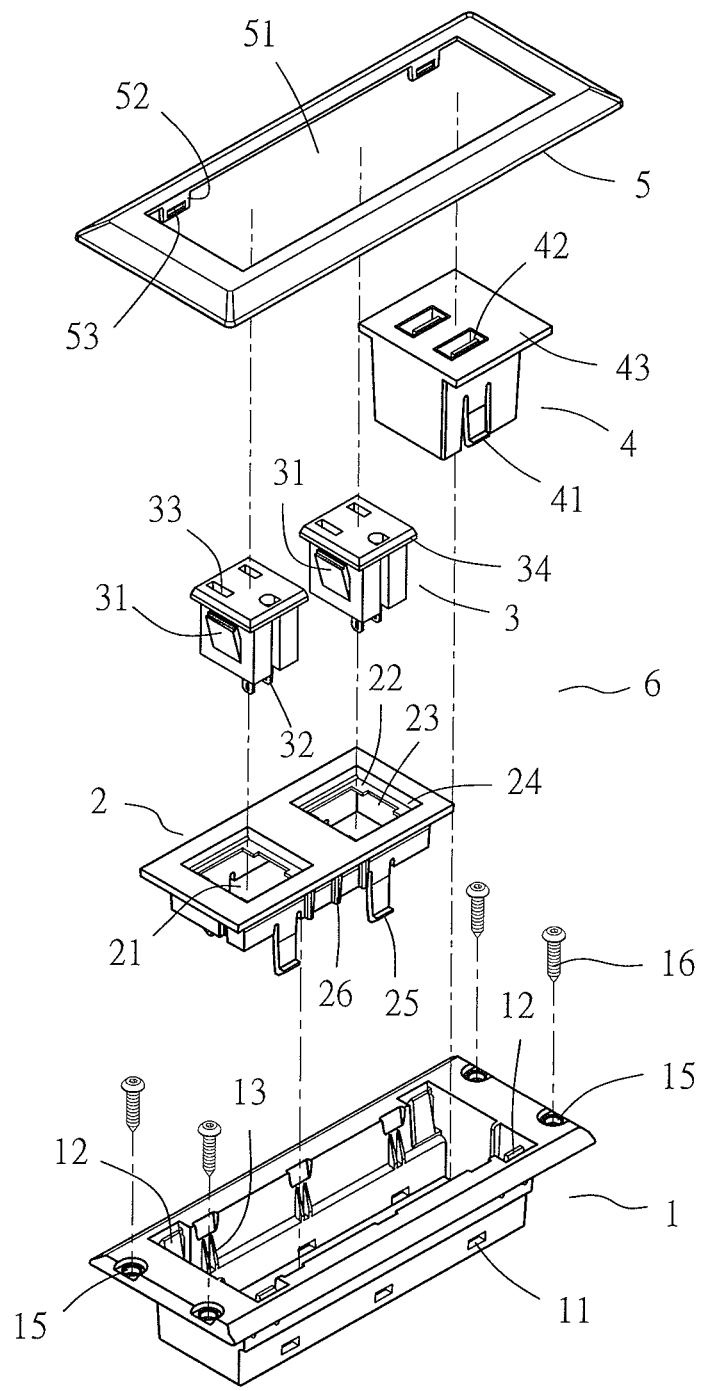
FIG. 1 is an exploded view of a power receptacle of the present invention.

A power receptacle assembly (shown in FIG. 1) of the present invention, provided in the form of a power receptacle 6, comprises a first housing 1, a second housing 2, one or more receptacle units 3, one or more functional receptacles 4, and a decorative bordered frame 5.

Figure 3:
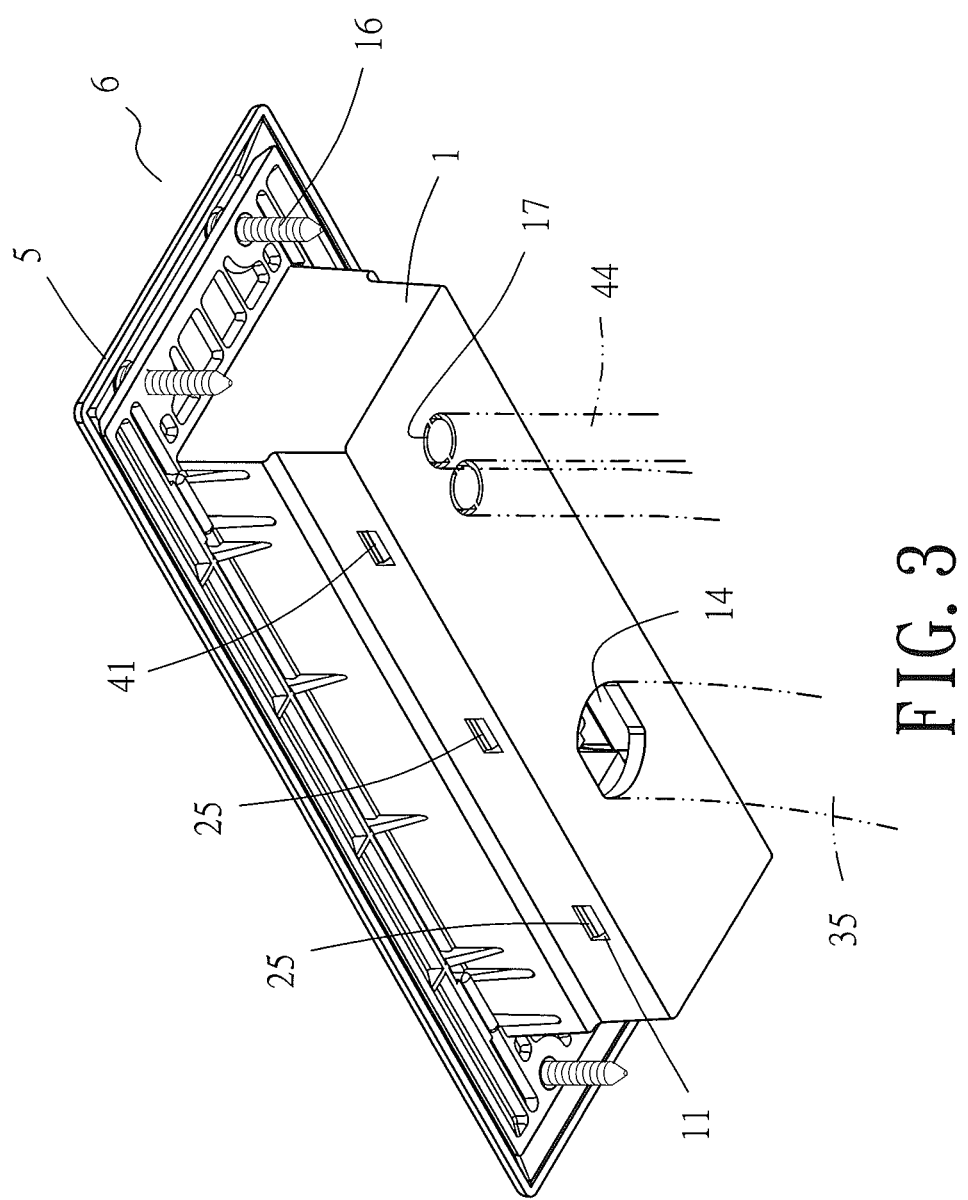
FIG. 3 is a perspective view of the power receptacle viewed from another angle according to the present invention.
Figure 5:
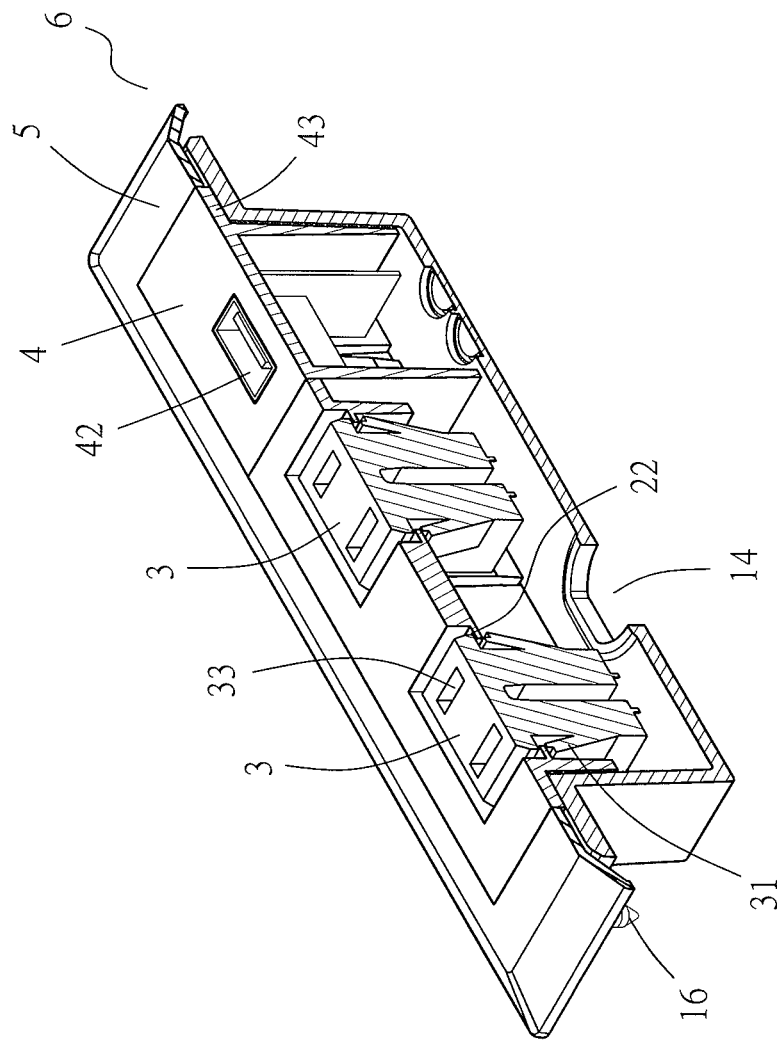
FIG. 5 is a cutaway view of the power receptacle of the present invention.

The first housing 1, which is a basic component of a power receptacle, has a predetermined width and depth. Two or more through holes 11 are disposed at lower portions of two opposing sides of the first housing 1, respectively. An upward portion of each corner in the internal space of the first housing 1 extends to form a hook portion 12. Two or more downward sloping guide portions 13 are disposed on two opposing sides facing the internal space of the first housing 1, respectively. One or more power cord outlets 14 and one or more USB card outlets 17 enable a power cord 35 and a USB cord 44 to output (shown in FIG. 3 and FIG. 5) and are disposed at the bottom of the first housing 1. Holes 15 are disposed on two opposing sides at upper portions of the first housing 1, respectively, and adapted to admit a screw 16 for fastening the first housing 1 in place within a predetermined closed space.

The second housing 2 is an inward insertion component with a predetermined width which depends on the internal space of the first housing 1. One or more receiving spaces 21 are disposed on the active surface of the second housing 2. A recess 23 is formed at each of two opposing peripheral flanges 22 of each receiving space 21. A recessed opening 24 is disposed at the periphery of each receiving space 21 on the upper portion of the second housing 2. A hook portion 25 with appropriate elasticity extends downward from each of two opposing outer sides of the second housing 2. One or more ribs 26 are disposed on the two opposing outer sides of the second housing 2, respectively.

Figure 7:
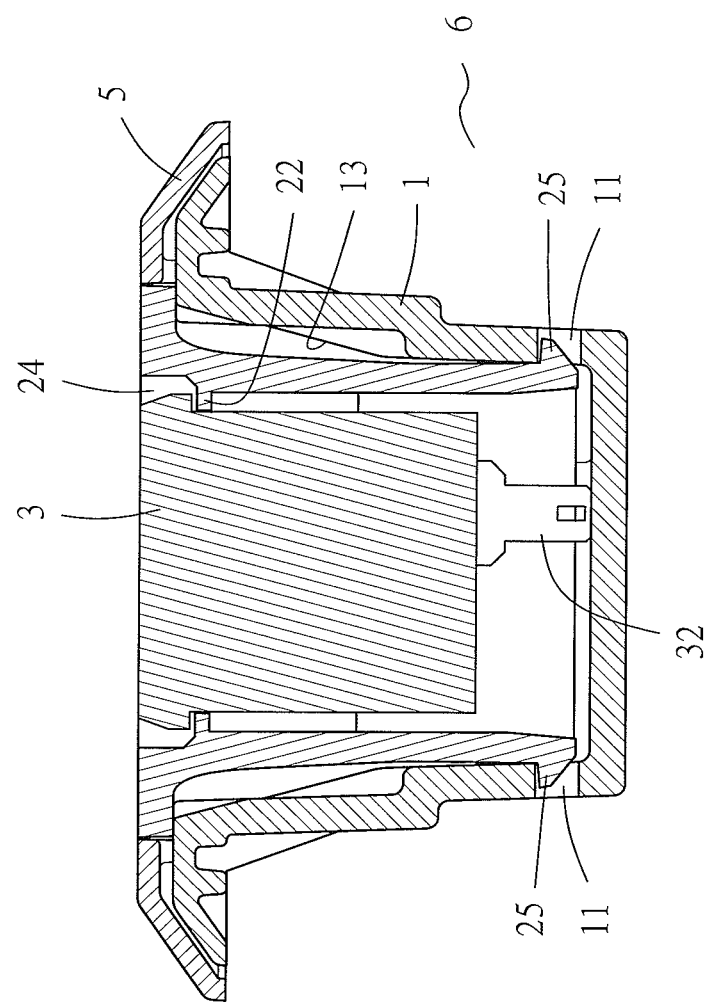
FIG. 7 is a cross-sectional view of the power receptacle taken along line 70-70 of FIG. 6.

The one or more receptacle units 3 are a conventional receptacle component designed according to each receiving space 21 of the second housing 2. Two opposing outer sides of the receptacle unit 3 each extend upward to form an abutting portion 31 (shown in FIG. 1, FIG. 5.) The lower portion of the receptacle unit 3 extends to form positive and negative terminals 32 (shown in FIG. 1, FIG. 7.) A slot 34 is disposed on the upper portion of the receptacle unit 3 and has a rim which protrudes slightly. The receptacle unit 3 is configured to operate under different voltages selectively, including 110V and 220V.

The one or more functional receptacles 4 are another inward insertion component designed according to the internal space of the first housing 1. Two outer sides of the functional receptacle 4 extend downward to form an appropriately elastic hook portion 41 which comes in the form of a slot selected from the group consisting of one or more HDMI (high-definition multimedia interface), USB, Ethernet (Internet data), VGA (video), RCA (video), RCA (audio), and 3.5mm plug (audio), or other type of electrical and/or data connection options. In this embodiment, the slot is provided in the form of a USB slot 42. The USB slot is configured to operate using any number of different power options (including the power options of 1000mA, and 2000mA) to not only facilitate electrical conduction and insertion of the plug of 3C products but also allow users' charging objects to effectuate appropriate electrical conduction and insertion. In addition, two opposing sides at the upper portion of the functional receptacle 4 extend to form protruding peripheries 43, respectively.

Figure 9:
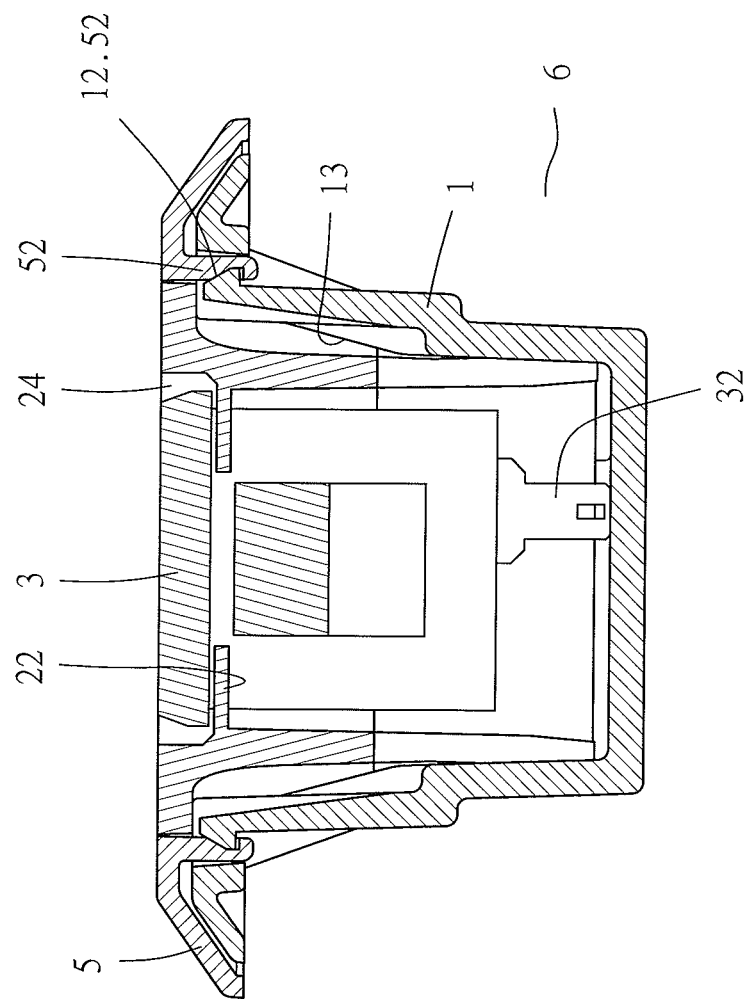
FIG. 9 is a cross-sectional view of the power receptacle taken along line 90-90 of FIG. 6.

The decorative bordered frame 5 is a concealing component designed according to the width of the first housing 1. A hole 51 is formed at the middle portion of the decorative bordered frame 5. Two opposing sides at the inner periphery of the hole 51 each extend downward to form a protruding portion 52. Each protruding portion 52 laterally dents to form a space 53 (shown in FIG. 1, FIG. 9.)

Figure 2:
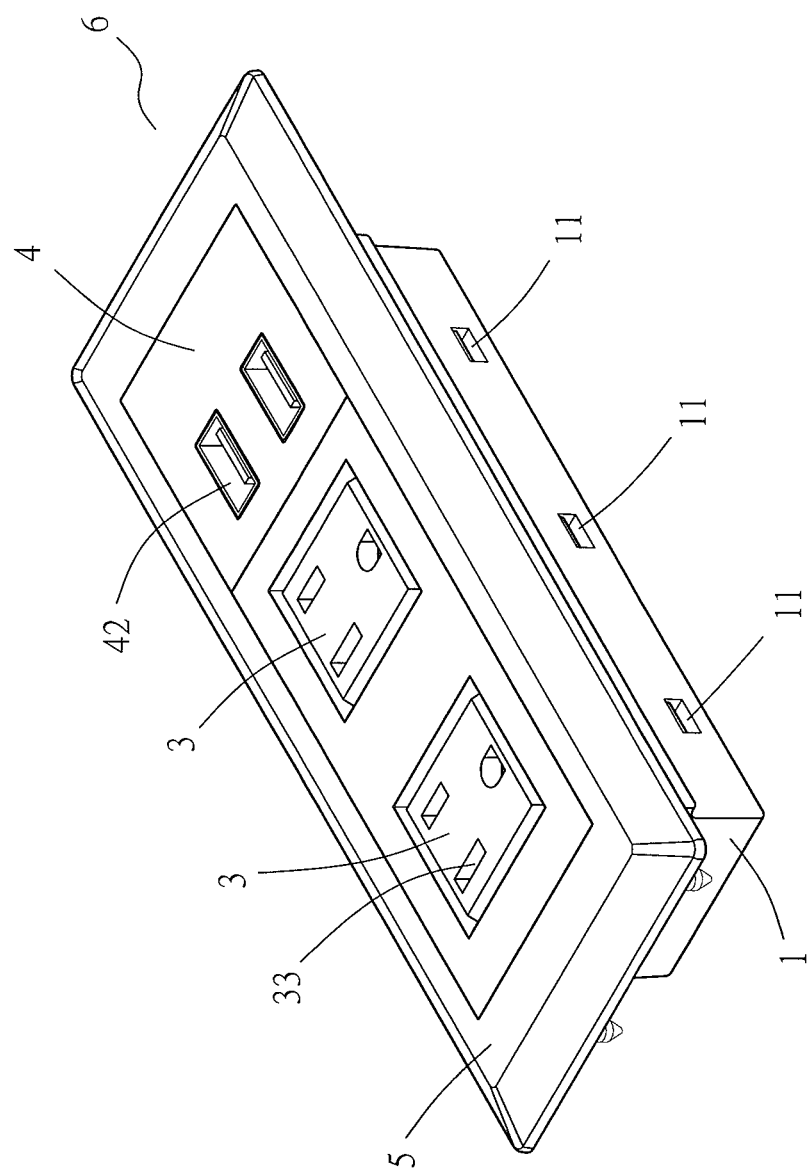
FIG. 2 is a perspective view of the power receptacle of the present invention.
Figure 4:
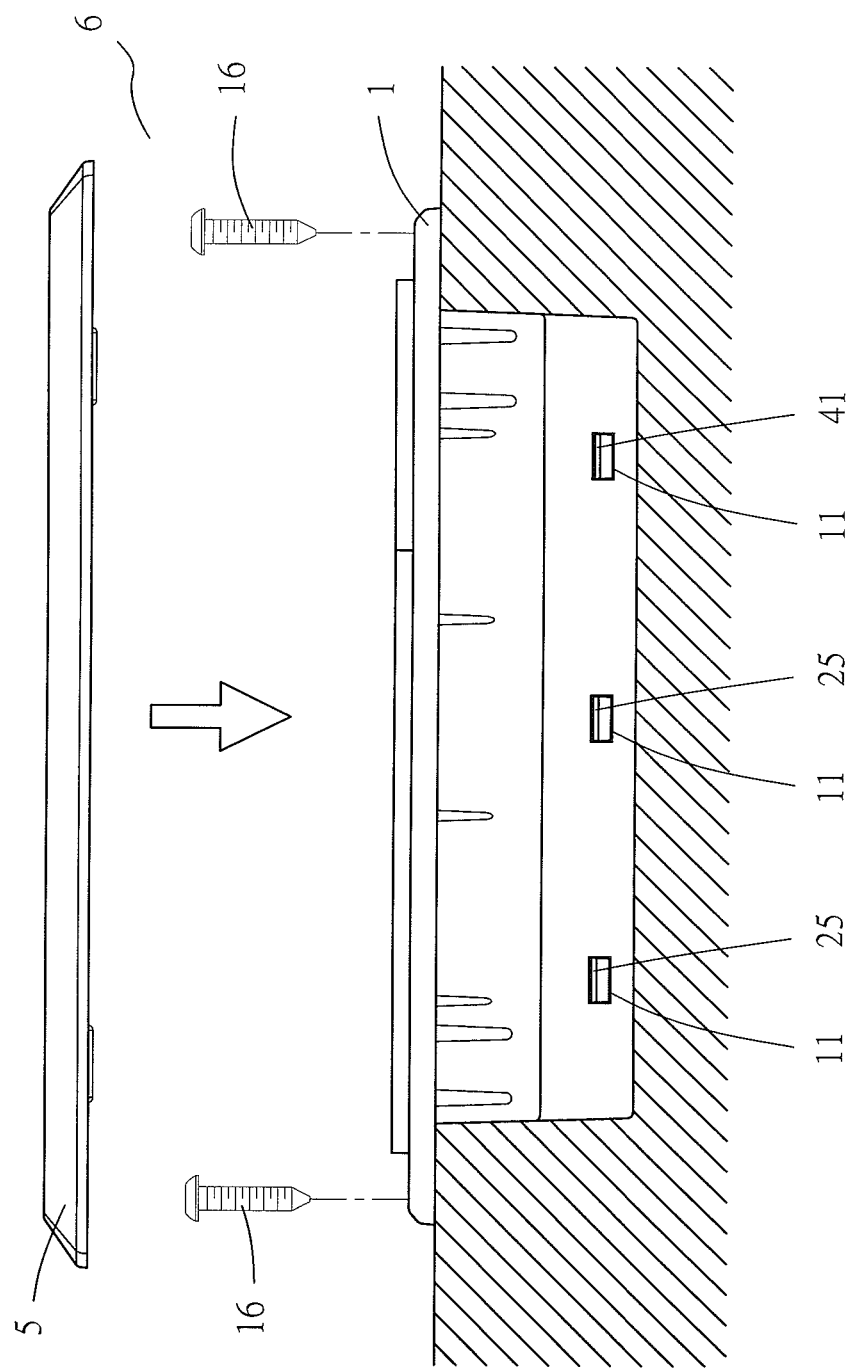
FIG. 4 is a front cross-sectional view of the power receptacle of the present invention.
Figure 6:
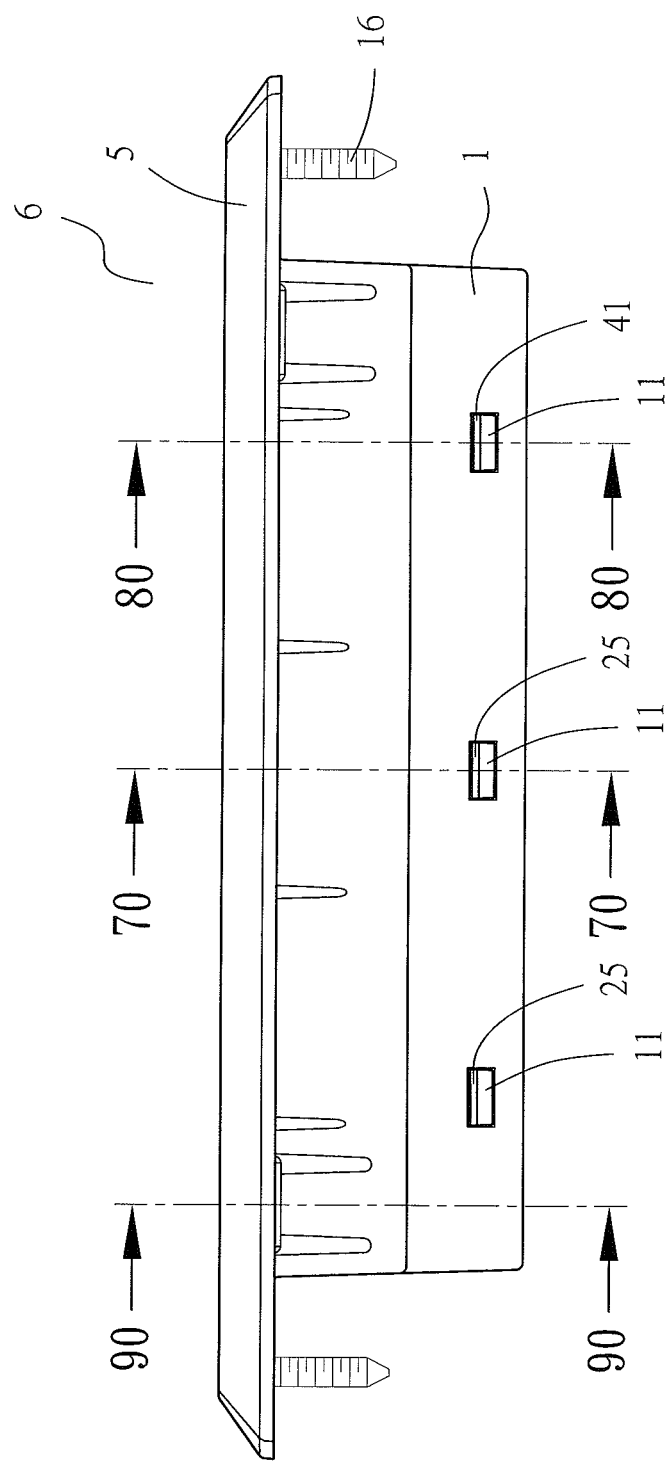
FIG. 6 is a schematic front view of the power receptacle of the present invention.
Figure 8:
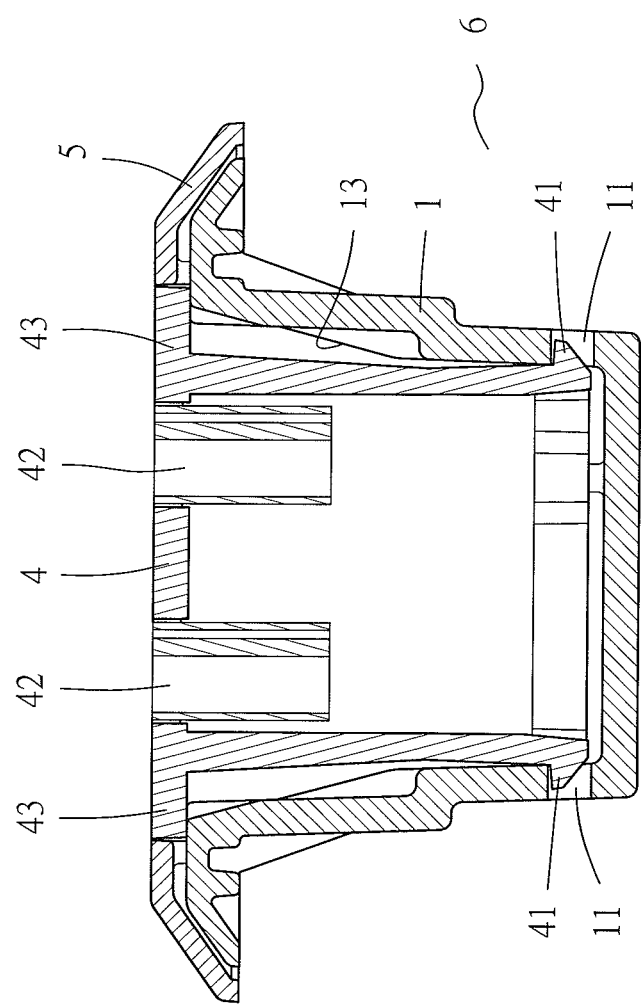
FIG. 8 is a cross-sectional view of the power receptacle taken along line 80-80 of FIG. 6.

A process flow of putting together the first housing 1, the second housing 2, the one or more receptacle units 3, the one or more functional receptacle 4, and the decorative bordered frame 5 (shown in FIG. 1, FIG. 5, FIG. 6) comprises the steps below. In the first step, the receptacle unit 3 is put in the receiving space 21 of the second housing 2. Then, the abutting portions 31 formed by extending two opposing outer sides of the receptacle unit 3 upward are guided into the receiving space 21 of the second housing 2 and passed through the recesses 23 to receive a positional restriction imposed by the peripheral flanges 22 adjacent to the bottom thereof. The slots 34 disposed on the upper portion of the receptacle unit 3 abut against the recessed openings 24 at the upper portion of the second housing 2, respectively. Thus, a predetermined number of receptacle units 3 operate in conjunction with the second housing 2 to attain a modularization design. In the second step, the second housing 2 engaged with the receptacle unit 3 is put in the internal space of the first housing 1 (with appropriate tightness maintained jointly by the ribs 26 disposed on the two outer sides of the second housing 2 and the opposing portions within the first housing 1). Thus, the elastic hook portions 25 extending downward from the two outer sides of the second housing 2 get engaged with the through holes 11 (shown in FIG. 7) disposed at the lower portions on the two opposing sides of the first housing 1. One or more functional receptacles 4 are put in the internal space of the first housing 1, and the hook portions 41 extending downward from the two outer sides of the functional receptacle 4 get engaged with the through holes 11 (shown in FIG. 8) disposed at the lower portions of the two opposing sides of the first housing 1. The two protruding peripheries 43 on the upper portion of the functional receptacle 4 abut against the upper portion of the first housing 1 (as the downward sloping guide portions 13 on the two opposing sides of the internal space of the first housing 1 enable the functional receptacle 4 to engage with or disengage from the two outer hook portions 41, 25 of the second housing 2 smoothly.) In the third step, the upper periphery of the first housing 1 is covered with the decorative bordered frame 5 to enable the hook portions 12 (shown in FIG. 9) of the first housing 1 to stick into the space 53 beside each protruding portion 52 extending downward from the inward side of the hole 51 of the decorative bordered frame 5 and thus enable quick positioning as soon as the decorative bordered frame 5 and the first housing 1 are coupled together. A, peripheral positional restriction (shown in FIG. 5) is imposed on the second housing 2 and the functional receptacle 4 engaged with the first housing 1, to effectuate further changes in appearance and thus finalize the assembly of the power receptacle 6 (shown in FIG. 2). The power cord 35 comes out of the functional receptacle 4 and the receptacle unit 3 engaged with the second housing 2 through the power cord outlet 14 disposed at a lower portion of the first housing 1 (shown in FIG. 3) to effectuate power connection of different data in accordance with required cable management. In the fourth step, all it needs to mount the power receptacle 6 in a predetermined space (shown in FIG. 4) is to remove the decorative bordered frame 5, insert the screws 16 into the holes 15 penetratingly disposed on the two sides of the upper portion of the first housing 1, screw the screws 16 into a corresponding portion of a predetermined space, and fasten the decorative bordered frame 5 to the top of the first housing 1. Thus, related components of the power receptacle 6 operate in conjunction with the first housing 1 to achieve flexible and quick engagement and allow the power receptacle 6 to be dismantled without destroying the engaging components.

The power receptacle 6, which comprises the second housing 2 engaged with one or more receptacle units 3, the first housing 1 engaged with one or more functional receptacles 4, and the decorative bordered frame 5 covering the upper periphery of the first housing 1, features a flexible combination of various forms and required variations in colors.

From the perspective of assembly, the power receptacle has the following advantages:

1. the power receptacle enables flexible and dynamic combination of a conventional receptacle unit and a functional receptacle to meet users' needs as well as easy engagement and precise positioning during the assembly process;

2. the power receptacle is mounted in a predetermined space by screwing a predefined screw in place to seal hermetically the predetermined space and render the decorative bordered frame flat when engaged;

3. the power receptacle comprises a predetermined number of receptacle units engaged with the second housing to effectuate a modularization design and operating in conjunction with a functional receptacle flexibly to meet consumers' needs;

4. the power receptacle allows a downward extending power cord to attain a selective coupling state and thus effectuate power connection of different data in accordance with predetermined cable management; and 5. the functional receptacle engaged with the power receptacle has USB slots configured to operate with power options (including the power options of 1000 mA, and 2000 mA or other power options).

What is claimed is:

1. A power receptacle assembly comprising:
a first housing including two opposing sides, two opposing ends and a bottom integrally connected together to define an internal space having an upper opening surrounded by an upper periphery extending outwardly of the two opposing sides and the two opposing ends, wherein first and second through holes are disposed at a lower portion of each of the two opposing sides of the first housing, wherein an upward portion of each corner in the internal space of the first housing has a hook portion extending upwardly spaced from the two opposing sides toward the upper opening;
a second housing including two opposing outer sides defining a first receiving space, with each receiving space having a top opening surrounded by peripheral flanges extending outwardly of the two opposing outer sides, with a recess formed in the peripheral flanges, with a hook extending downward from each of the two outer sides of the second housing and removably received in the first through hole of the first housing;
a receptacle unit including a rim slideably receivable in the recess and first and second abutting portions abutting with the peripheral flanges opposite to the recess;
a functional receptacle including a protruding periphery abutting with the upper periphery of the first housing and opposing hooks extending downward and removably received in the second through holes of the first housing; and
a decorative bordered frame including protruding portions and a space positioned beside each protruding portion, wherein each hook portion of the first housing is inserted into the space positioned beside the protruding portion extending downward from a corresponding corner of the decorative bordered frame covering the upper periphery of the first housing, to enable quick coupling of the decorative bordered frame and the first housing together and imposing a peripheral positional restriction on the second housing and the functional receptacle engaged with the first housing.

2. The power receptacle assembly of claim 1, wherein screw holes are penetratingly disposed at the upper periphery of the first housing, and adapted to admit a screw to insert into for fastening the first housing to tables or walls, and wherein such screw holes are covered by the decorative bordered frame.

3. The power receptacle assembly of claim 1, wherein the functional receptacle engaged with the first housing has slots each provided in a form of one or more HDMI (high-definition multimedia interface), USB, Ethernet (Internet data), VGA (video), RCA (video), RCA (audio), or 3.5 mm plug (audio), or other type of electrical and/or data connection options to facilitate electrical conduction and insertion of a plug of 3C products.

4. The power receptacle assembly of claim 1, wherein the receptacle unit engaged with the second housing is configured to operate under different voltages including 110V and 220V.

5. The power receptacle assembly of claim 1, wherein the second housing has a second receiving space.

6. The power receptacle assembly of claim 1, wherein each opposing outer side of the second housing includes a rib abutting with one of the two opposing sides of the first housing.

7. The power receptacle assembly of claim 1, wherein sloping guide portions are disposed on the two opposing sides and face the internal space of the first housing, with the opposing hooks of the functional receptacle engaging with or disengaging from the second through holes of the first housing smoothly.

8. The power receptacle assembly of claim 7, wherein the first housing engaged with the functional receptacle has one or more USB slots configured to operate with power options whereby users' charging objects effectuate appropriate electrical conduction and insertion.

\* \* \* \* \*